United States Patent
Kuranoshita

(10) Patent No.: US 12,537,926 B2
(45) Date of Patent: Jan. 27, 2026

(54) MOBILE OBJECT, CONTROL DEVICE, AND IMAGING METHOD

(71) Applicant: FUJIFILM Corporation, Tokyo (JP)

(72) Inventor: Masashi Kuranoshita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 168 days.

(21) Appl. No.: 17/747,678

(22) Filed: May 18, 2022

(65) Prior Publication Data

US 2022/0279155 A1 Sep. 1, 2022

Related U.S. Application Data

(63) Continuation of application No. PCT/JP2020/041641, filed on Nov. 9, 2020.

(30) Foreign Application Priority Data

Dec. 9, 2019 (JP) .................................. 2019-221839

(51) Int. Cl.
*H04N 13/25* (2018.01)
*H04N 13/257* (2018.01)
(Continued)

(52) U.S. Cl.
CPC .......... *H04N 13/25* (2018.05); *H04N 13/257* (2018.05); *H04N 13/286* (2018.05); *B64U 10/13* (2023.01); *B64U 2101/30* (2023.01)

(58) Field of Classification Search
CPC .... H04N 13/25; H04N 13/257; H04N 13/286; B64C 39/024; B64U 2101/30
(Continued)

(56) References Cited

U.S. PATENT DOCUMENTS 9,898,821 B2 2/2018 Metzler et al.
2007/0257910 A1\* 11/2007 Gutmann ............... G06V 20/10
700/262
(Continued)

FOREIGN PATENT DOCUMENTS

CN 106295141 A 1/2017
JP 2010-256252 A 11/2010
(Continued)

OTHER PUBLICATIONS

The extended European search report issued by the European Patent Office on Dec. 23, 2022, which corresponds to European Patent Application No. 20899530.8.
(Continued)

*Primary Examiner* — Rebecca A Volentine
*Assistant Examiner* — Jimmy S Lee
(74) *Attorney, Agent, or Firm* — Studebaker Brackett PLLC

(57) ABSTRACT

A mobile object includes a mobile object main body, an imaging device that is included in the mobile object main body and that performs imaging of a target object, the imaging device including an image data acquisition device and a three-dimensional data acquisition device that are calibrated, and a control device that acquires, for the target object, unit image data in which image data acquired for each angle of view of the image data acquisition device and three-dimensional data acquired by the three-dimensional data acquisition device are associated with each other from the imaging device, performs plane estimation on an imaging target, based on the three-dimensional data, determines whether the imaging target is a plane, and in the case where it is determined that the imaging target is the plane, determines a first distance until next unit image data is acquired based on information on the plane.

9 Claims, 15 Drawing Sheets

(51) Int. Cl.
*H04N 13/286* (2018.01)
*B64U 10/13* (2023.01)
*B64U 101/30* (2023.01)

(58) Field of Classification Search
USPC .......................................................... 348/46
See application file for complete search history.

(56) References Cited

U.S. PATENT DOCUMENTS

| | | |
|---|---|---|
| 2014/0184780 A1 | 7/2014 | Abe |
| 2017/0272726 A1* | 9/2017 | Ovsiannikov .......... G01C 25/00 |
| 2019/0011529 A1* | 1/2019 | Choi ....................... B64C 39/024 |
| 2019/0371056 A1* | 12/2019 | Wetzel .................... G01S 17/89 |
| 2019/0394448 A1* | 12/2019 | Ziegler .................... G06T 7/60 |
| 2020/0159252 A1* | 5/2020 | Giuffrida .............. B64C 39/024 |
| 2021/0358102 A1* | 11/2021 | Zhao .................. B64U 2201/10 |

FOREIGN PATENT DOCUMENTS

| | | |
|---|---|---|
| JP | 2013-083925 A | 5/2013 |
| JP | 2013-092407 A | 5/2013 |
| JP | 2015-114954 A | 6/2015 |
| JP | 2016-105081 A | 6/2016 |
| JP | 5947634 B2 | 7/2016 |
| JP | 2019-028560 A | 2/2019 |
| JP | 6586602 B1 | 10/2019 |
| WO | 2014/147863 A1 | 9/2014 |

OTHER PUBLICATIONS

International Search Report issued in PCT/JP2020/041641; mailed Feb. 2, 2021.
International Preliminary Report On Patentability and Written Opinion issued in PCT/JP2020/041641; issued May 17, 2022.
An Office Action mailed by China National Intellectual Property Administration on Mar. 10, 2024, which corresponds to Chinese Patent Application No. 202080084181.4 and is related to U.S. Appl. No. 17/747,678; with English language translation.

* cited by examiner

FIG. 1
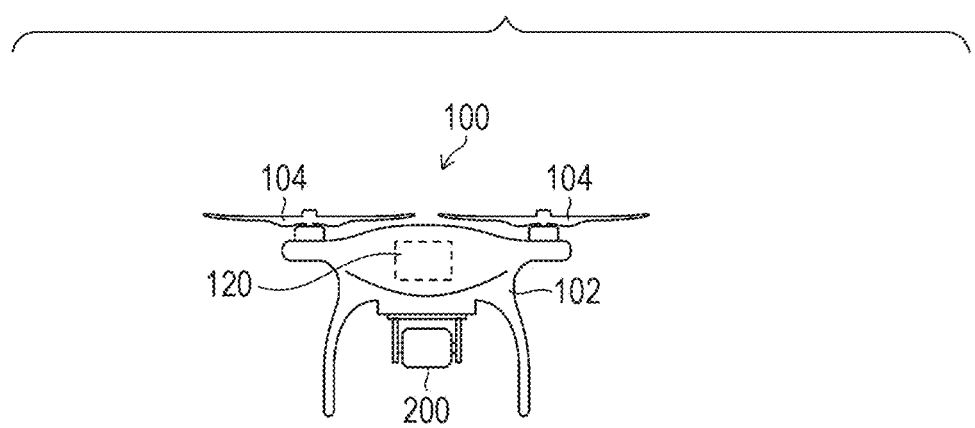
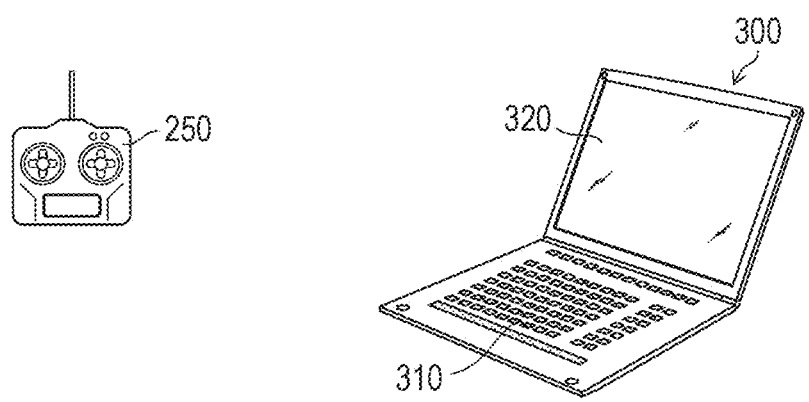

MOBILE OBJECT, CONTROL DEVICE, AND IMAGING METHOD

CROSS-REFERENCE TO RELATED APPLICATIONS

This application is a Continuation of PCT International Application No. PCT/JP2020/041641 filed on Nov. 9, 2020, which claims priority under 35 U.S.C § 119(a) to Japanese Patent Application No. 2019-221839 filed on Dec. 9, 2019. Each of the above application(s) is hereby expressly incorporated by reference, in its entirety, into the present application.

BACKGROUND OF THE INVENTION

1. Field of the Invention

The present invention relates to a mobile object, a control device, and an imaging method.

2. Description of the Related Art

In recent years, techniques have been proposed in which a mobile object such as a drone is provided with a camera, which is used to acquire a captured image of a structure, and a three-dimensional model is generated from the acquired captured image.

For example, JP2015-114954A proposes a technique for acquiring two-dimensional image data of a target object using a mobile object provided with a camera and generating a three-dimensional point group using SfM (Structure from Motion) to generate a three-dimensional model.

SUMMARY OF THE INVENTION

In SfM, a large amount of two-dimensional image data is acquired with imaging ranges overlapped with each other, and a self-position and the coordinates of a target object are estimated to generate a three-dimensional point group of the target object. This requires processing of a large amount of two-dimensional image data and may increase the processing time.

The present invention has been made in view of such a situation, and an object thereof is to provide a mobile object, a control device, and an imaging method that can reduce image data.

A mobile object of a first aspect includes a mobile object main body; an imaging device that is included in the mobile object main body and that performs imaging of a target object, the imaging device including an image data acquisition device and a three-dimensional data acquisition device that are calibrated; and a control device that acquires, for the target object, unit image data in which image data acquired for each angle of view of the image data acquisition device and three-dimensional data acquired by the three-dimensional data acquisition device are associated with each other from the imaging device, performs plane estimation on an imaging target, based on the three-dimensional data, determines whether the imaging target is a plane, and determines, in the case where it is determined that the imaging target is the plane, a first distance until next unit image data is acquired, based on information on the plane. According to the first aspect, image data can be reduced.

In a mobile object of a second aspect, in the case where it is determined that the imaging target is not the plane, the control device determines a second distance shorter than the first distance as a distance until next unit image data is acquired. According to the second aspect, since the second distance is shorter than the first distance, image data can effectively be reduced.

In a mobile object of a third aspect, the imaging device simultaneously acquires the image data and the three-dimensional data. According to the third aspect, acquisition of the image data and the three-dimensional data is facilitated.

In a mobile object of a fourth aspect, the three-dimensional data acquisition device includes one of a stereo camera, a laser scanner, or a time-of-flight camera. The fourth aspect identifies a preferred three-dimensional data acquisition device.

In a mobile object of a fifth aspect, the image data is two-dimensional color image data. The fifth aspect identifies a preferred type of image data.

In a mobile object of a sixth aspect, the mobile object main body including the imaging device and the control device is an unmanned aerial vehicle. According to the sixth aspect, imaging of the target object is facilitated.

A control device of a seventh aspect is a control device that is included in a mobile object main body and that controls an imaging device, the imaging device performing imaging of a target object and including an image data acquisition device and a three-dimensional data acquisition device that are calibrated. The control device acquires, for the target object, unit image data in which image data acquired for each angle of view of the image data acquisition device and three-dimensional data acquired by the three-dimensional data acquisition device are associated with each other from the imaging device, performs plane estimation on an imaging target, based on the three-dimensional data, determines whether the imaging target is a plane, and determines, in the case where it is determined that the imaging target is the plane, a first distance until next unit image data is acquired, based on information on the plane. According to the seventh aspect, image data can be reduced.

In a control device of an eighth aspect, in the case where it is determined that the imaging target is not the plane, the control device determines a second distance shorter than the first distance as a distance until next unit image data is acquired. According to the eighth aspect, since the second distance is shorter than the first distance, image data can effectively be reduced.

An imaging method of a ninth aspect includes a step of acquiring, for a target object, unit image data in which image data and three-dimensional data are associated with each other, during movement; a step of performing plane estimation on an imaging target, based on the three-dimensional data of the unit image data; a step of determining whether the imaging target is a plane; and a step of determining, in the case where it is determined that the imaging target is the plane, a first distance until next unit image data is acquired, based on information on the plane. According to the ninth aspect, image data can be reduced.

An imaging method of a tenth aspect further includes a step of determining, in the case where it is determined that the imaging target is not the plane, a second distance shorter than the first distance as a distance until next unit image data is acquired. According to the tenth aspect, since the second distance is shorter than the first distance, image data can effectively be reduced.

According to the present invention, image data can be reduced, and an increase in processing time can be avoided.

BRIEF DESCRIPTION OF THE DRAWINGS

FIG. 1 is a diagram conceptually illustrating an image processing system;

DESCRIPTION OF THE PREFERRED EMBODIMENTS

Figure 2:
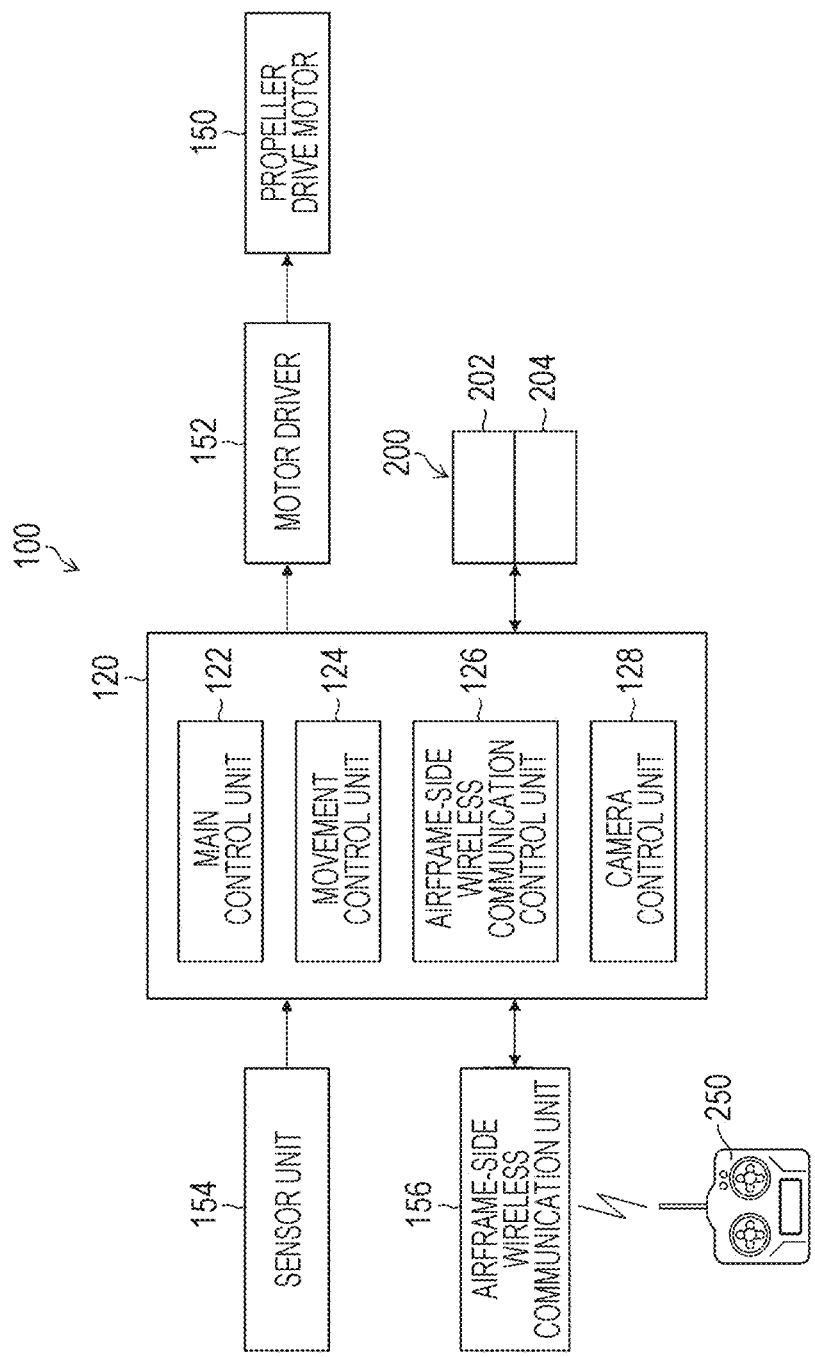
FIG. 2 is a block diagram illustrating functions implemented by a control device.

Preferred embodiments of a mobile object, a control device, and an imaging method according to the present invention will be described hereinafter with reference to the accompanying drawings.

FIG. 1 is a diagram conceptually illustrating an image processing system constituted by an image processing apparatus 300 and a mobile object 100. The mobile object 100 is, for example, an unmanned aerial vehicle (UAV). The mobile object 100 has a mobile object main body 102, propulsion units 104 included in the mobile object main body 102, and a control device 120 included in the mobile object main body 102. The mobile object main body 102 is a member that forms a main shape of the mobile object 100. In an embodiment, a plurality of propellers and propeller drive motors are attached to the mobile object main body 102. The propellers and the propeller drive motors constitute the propulsion units 104. The mobile object 100 may be a vehicle or a ship. Alternatively, the mobile object 100 may be a self-propelled robot.

The mobile object 100 is provided with an imaging device 200. The imaging device 200 is attachable to the mobile object main body 102 through a gimbal (not illustrated), for example. As described below, the mobile object 100 further includes an image data acquisition device 202 and a three-dimensional data acquisition device 204 (see FIG. 2). The mobile object 100 flies in the air in accordance with an operation performed by a controller 250. The mobile object 100 acquires a plurality of pieces of unit image data for a target object by using the imaging device 200 provided therein. Examples of the target object include structures such as a bridge, a dam, a tunnel, and a building. However, the target object is not limited to such structures.

The image processing apparatus 300 is constituted by a computer including a CPU (Central Processing Unit), a ROM (read-only memory), a RAM (Random Access Memory), and so on. The image processing apparatus 300 includes, for example, an operation unit 310 and a display unit 320. The computer constituting the image processing apparatus 300 functions as the image processing apparatus 300 in response to the CPU executing a structure management program stored in the ROM.

FIG. 2 is a block diagram illustrating a configuration of the control device 120 included in the mobile object 100. The mobile object 100 includes propeller drive motors 150, a motor driver 152, a sensor unit 154, an airframe-side wireless communication unit 156, and the control device 120. The control device 120 is constituted by, for example, a microcomputer.

The control device 120 includes a main control unit 122, a movement control unit 124, an airframe-side wireless communication control unit 126, and a camera control unit 128. The main control unit 122 manages all of the respective functions of the movement control unit 124, the airframe-side wireless communication control unit 126, and the camera control unit 128. The control device 120 executes a program, thereby being able to function as the main control unit 122, the movement control unit 124, the airframe-side wireless communication control unit 126, and the camera control unit 128.

The movement control unit 124 controls the driving of the propeller drive motors 150 through the motor driver 152 to control the flight (movement) of the mobile object 100. The movement control unit 124 controls, based on a control signal transmitted from the controller 250 and information on a flight state of the mobile object 100, which is output from the sensor unit 154, the driving of each of the propeller drive motors 150 to control the flight of the mobile object 100. For example, upon an instruction from the controller 250 to fly upward, the movement control unit 124 controls the driving of each of the propeller drive motors 150 so that the airframe is raised. Upon an instruction from the controller 250 to fly downward, the movement control unit 124 controls the driving of each of the propeller drive motors 150 so that the airframe is lowered. Further, upon an instruction from the controller 250 to turn, the movement control unit 124 controls the driving of each of the propeller drive motors 150 so that the airframe turns in an instructed direction. During imaging, the movement control unit 124 controls the driving of each of the propeller drive motors 150 so that the airframe flies at a predetermined speed. The propeller drive motors 150 cause the propellers (not illustrated) to rotate to apply a propulsive force to the mobile object 100. The mobile object 100 includes the plurality of propeller drive motors 150 and propellers and is capable of moving in directions by making the rotational forces of the propellers different. A flight path of the mobile object 100 can be set in advance.

The sensor unit 154 detects the flight state of the mobile object 100. The sensor unit 154 is configured to include various types of sensors such as an IMU (inertial measurement unit) and a GNSS (Global Navigation Satellite System). The IMU is configured such that, for example, a gyro sensor, a geomagnetic sensor, an acceleration sensor, a speed sensor, and the like are combined in a plurality of axes. The sensor unit 154 outputs information on the flight state of the mobile object 100, which is detected with the various sensors, to the control device 120.

The airframe-side wireless communication unit 156 wirelessly communicates with the controller 250 and transmits and receives various signals to and from the controller 250 under the control of the control device 120. For example, in the case where the controller 250 is operated, a control signal based on the operation is transmitted from the controller 250 to the mobile object 100. The airframe-side wireless communication unit 156 receives the control signal transmitted from the controller 250 and outputs the control signal to the control device 120.

The control device 120 includes a CPU (Central Processing Unit), a ROM (Read Only Memory), and a RAM (Random Access Memory), which are not illustrated, and executes a predetermined program to implement various functions. The program is stored in the ROM.

The camera control unit 128 controls the imaging device 200, based on a control signal transmitted from the controller 250. For example, in response to an instruction from the controller 250 to start imaging, the camera control unit 128 causes the imaging device 200 to start imaging. In response to an instruction from the controller 250 to terminate imaging, the camera control unit 128 causes the imaging device 200 to terminate imaging.

The airframe-side wireless communication control unit 126 controls communication with the controller 250 through the airframe-side wireless communication unit 156.

A flight plan of the mobile object 100 and imaging conditions of the imaging device 200 can be determined in advance by control software or the like. The flight plan includes, for example, a flight path, a speed, and an altitude of the mobile object 100. The imaging conditions include causing the imaging device 200 to perform imaging at equal time intervals and to perform imaging at equal distance intervals, and the like. Conditions such as equal time intervals and equal distance intervals are appropriately selected. The main control unit 122 controls the movement control unit 124 in accordance with the flight plan. The movement control unit 124 controls the driving of the propeller drive motors 150 through the motor driver 152 in accordance with a signal from the main control unit 122. The main control unit 122 controls the camera control unit 128 in accordance with the imaging conditions. The camera control unit 128 controls the imaging device 200. The flight plan and the imaging conditions are combined to determine an overlap rate of imaging ranges along a flight path and a sidelap rate of imaging ranges in adjacent flight paths. As described below, the mobile object 100 of an embodiment is capable of determining the imaging conditions and the like of the mobile object 100 in accordance with the shape of a target object to be subjected to imaging.

Figure 3:
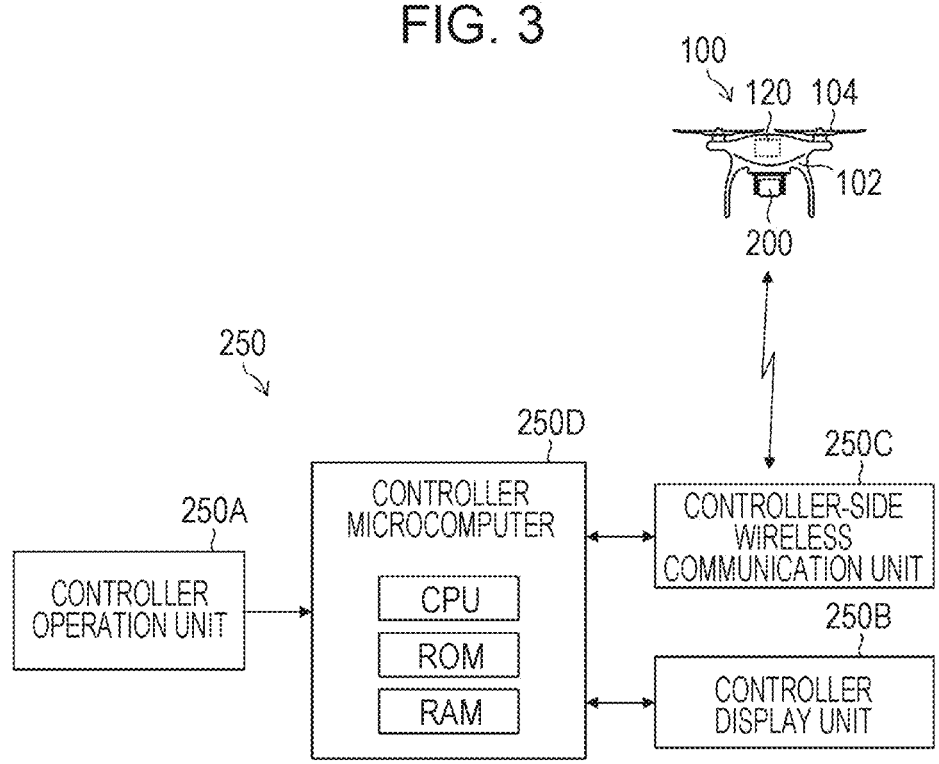
FIG. 3 is a block diagram of a controller.

FIG. 3 is a block diagram illustrating an electric configuration of a controller.

The controller 250 includes a controller operation unit 250A, a controller display unit 250B, a controller-side wireless communication unit 250C, and a controller microcomputer 250D.

The controller operation unit 250A is configured to include various operating members for operating the mobile object 100. Operating members for operating the mobile object main body 102 including the propulsion unit include, for example, an operating member for instructing the mobile object main body 102 to fly upward or downward, an operating member for instructing the mobile object main body 102 turn, and so on. Operating members for operating the imaging device 200 include, for example, an operating member for instructing start of imaging and termination of imaging, and so on.

The controller display unit 250B is constituted by, for example, an LCD (Liquid Crystal Display). The controller display unit 250B displays, for example, information on the flight state of the mobile object 100.

The controller-side wireless communication unit 250C wirelessly communicates with the mobile object 100 and transmits and receives various signals to and from the mobile object 100 under the control of the controller microcomputer 250D.

The controller microcomputer 250D is a control unit that integrally controls the overall operation of the controller 250. The controller microcomputer 250D includes a CPU, a ROM, and a RAM and executes a predetermined program to implement various functions. For example, when the controller operation unit 250A is operated, a control signal corresponding to the operation is generated. The control signal is transmitted to the mobile object 100 through the controller-side wireless communication unit 250C. Further, the controller 250 acquires flight state information from the mobile object 100 through the controller-side wireless communication unit 250C and displays the flight state information on the controller display unit 250B. The program is stored in the ROM.

Figure 4:
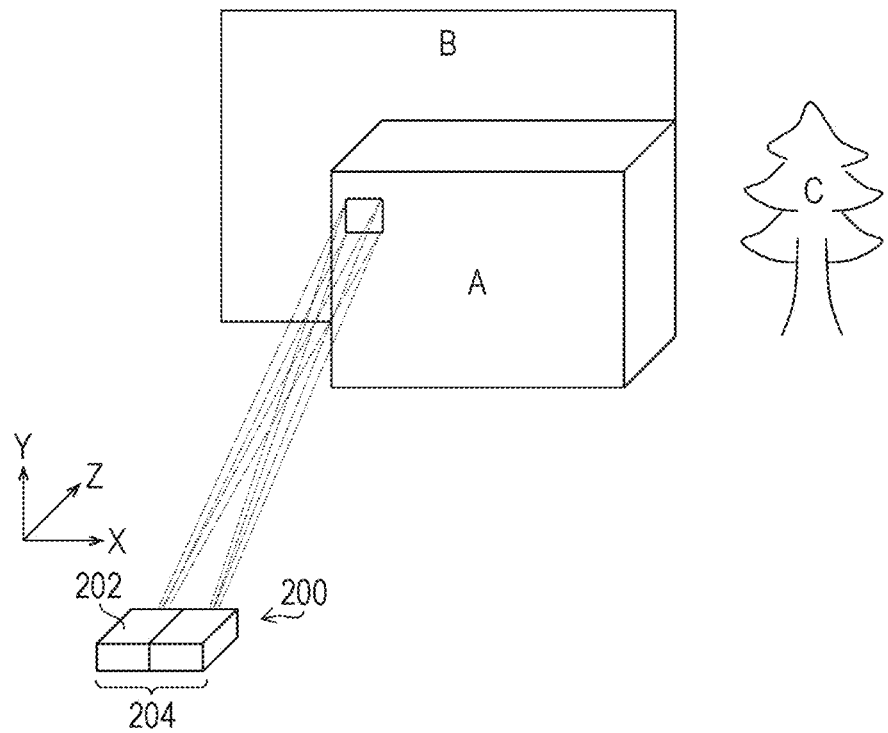
FIG. 4 is a conceptual diagram illustrating imaging of a target object by using an image data acquisition device and a three-dimensional data acquisition device.

FIG. 4 is a conceptual diagram of imaging of a target object by an imaging device including an image data acquisition device and a three-dimensional data acquisition device. The imaging device 200 includes the image data acquisition device 202 and the three-dimensional data acquisition device 204. The target object includes structures A and B having a planar shape, and a structure C having no plane. The image data acquisition device 202 acquires two-dimensional image data of the target object. The image data acquisition device 202 includes an imaging element such as a CMOS (Complementary Metal Oxide Semiconductor) imaging element (not illustrated). The imaging element has a plurality of pixels constituted by photoelectric conversion elements arranged two-dimensionally in an x direction (horizontal direction) and a y direction (vertical direction), and color filters (not illustrated) are arranged on an upper surface of the plurality of pixels such that, for example, R (red), G (green), and B (blue) filters are arranged two-dimensionally in a Bayer pattern. In an embodiment, the image data acquisition device 202 is capable of acquiring two-dimensional color image data. The image data acquisition device 202 acquires image data for each angle of view through each imaging operation. The imaging range is determined by the angle of view of the image data acquisition device 202. The image data acquisition device 202 acquires a plurality of pieces of image data for the target object. The angle of view represents an imaging range in which imaging is performed by the image data acquisition device 202.

The three-dimensional data acquisition device 204 acquires three-dimensional data of the target object. The three-dimensional data acquisition device 204 is, for example, a stereo camera. The stereo camera is a camera that simultaneously captures image data from a plurality of cameras located at different positions and acquires three-dimensional data up to the target object by using parallax in the image data. In the case where the three-dimensional data acquisition device 204 is a stereo camera, one of a plurality of cameras can be used as the image data acquisition device 202. The image data acquisition device 202 can be provided separately from the three-dimensional data acquisition device 204.

The case where the three-dimensional data acquisition device 204 is a stereo camera has been described. The three-dimensional data can be acquired using a laser scanner or a time-of-flight (ToF) camera.

The laser scanner emits a laser pulse to a target object and measures a distance by the time taken for the laser pulse reflected at the surface of the target object to return. Then, three-dimensional data of the reflection point of the laser pulse is acquired from the measured distance and angle information of the emission direction of the laser pulse. That is, the three-dimensional data includes three-dimensional coordinates. The laser scanner is not limited to one based on the time-of-flight method, and can use a phase difference method or a trigonometric method to acquire three-dimensional data.

The time-of-flight camera is a camera that measures a flight time of light to acquire three-dimensional data.

Figure 5:
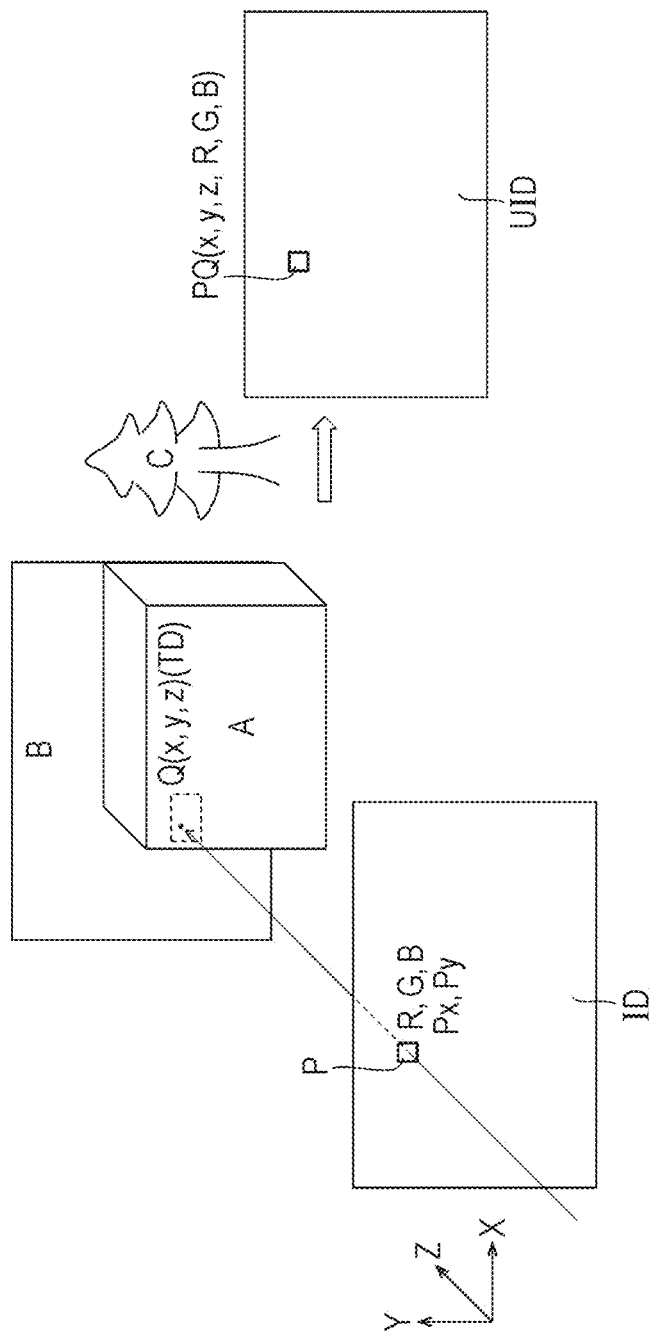
FIG. 5 is a conceptual diagram describing a correspondence relationship between image data and three-dimensional data.

FIG. 5 is a conceptual diagram describing a correspondence relationship between image data and three-dimensional data. Image data ID includes data of a plurality of pixels P that are two-dimensionally arranged. The image data ID is data of an angle-of-view range. The pixels P have respective values for R, G, and B. FIG. 5 illustrates a pixel P at coordinates (Px, Py) in the image data ID, and a point Q having a positional relationship corresponding to the pixel P for the target object. The point Q has three-dimensional data (x, y, z), which is position information. That is, the three-dimensional data is three-dimensional coordinates. Since the image data acquisition device 202 and the three-dimensional data acquisition device 204 are calibrated, the pixel P and the point Q are associated with each other. Unit image data UID in which pixels of the image data ID and three-dimensional data TD are associated with each other is acquired. Each piece of data PQ of the unit image data UID has the three-dimensional data (x, y, z) of the point Q and information on the values (R, G, B) of the pixel P. The imaging device 200 provided in the mobile object 100 acquires a plurality of pieces of unit image data UID for the target object in accordance with the flight plan and the imaging conditions. The image data ID and the three-dimensional data TD, which are included in the unit image data UID, are preferably acquired simultaneously. The association between the image data ID and the three-dimensional data TD is facilitated.

Figure 6:
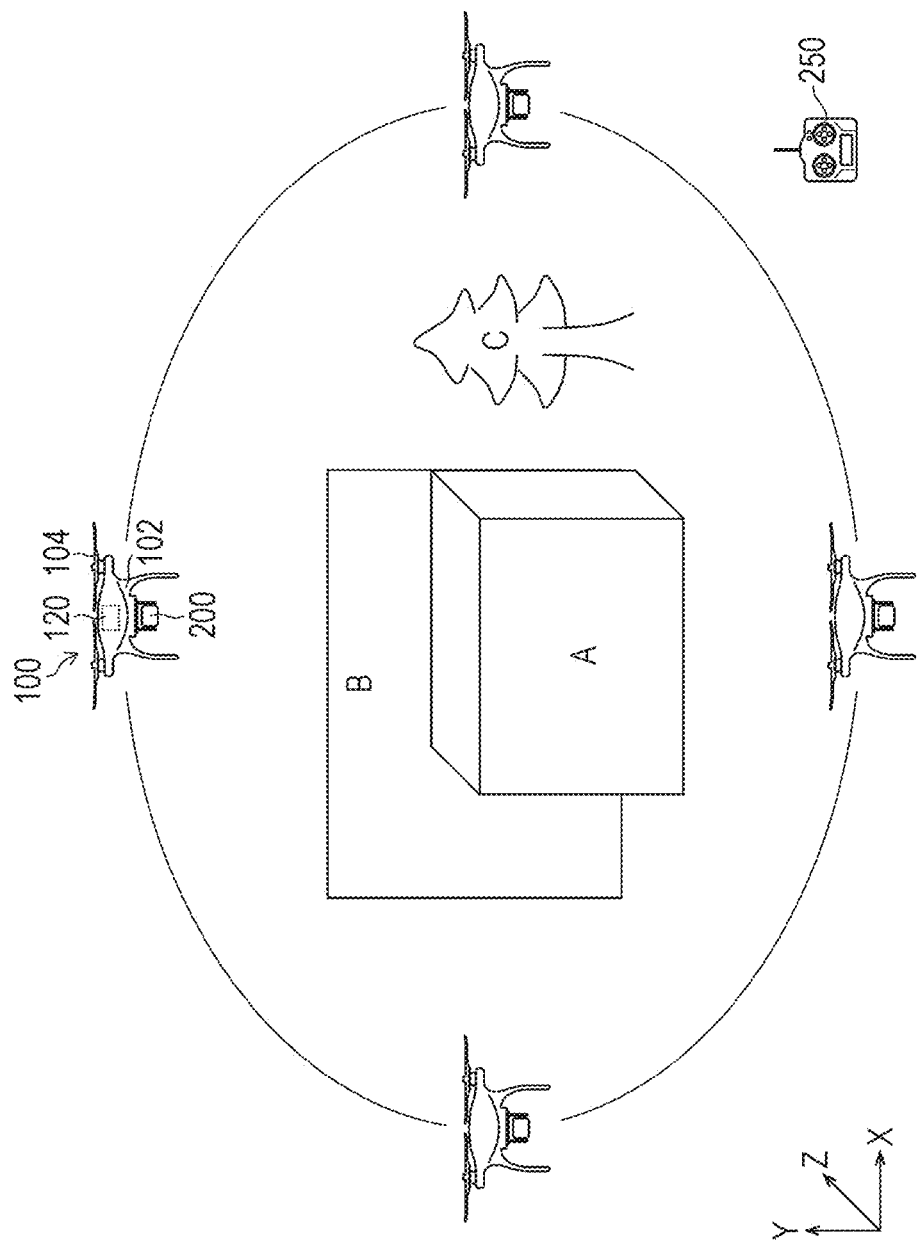
FIG. 6 is a diagram conceptually illustrating how an imaging device provided in a mobile object performs imaging of a target object.

The operation of the mobile object 100 will be described with reference to the drawings. As illustrated in FIG. 6, the mobile object 100 provided with the imaging device 200 flies around the target object in accordance with the flight plan. The image data acquisition device 202 (not illustrated) and the three-dimensional data acquisition device 204 (not illustrated), which are included in the imaging device 200, perform imaging of the target object in accordance with the imaging conditions and acquire a plurality of pieces of unit image data UID. The flight plan and the imaging conditions are input from, for example, the controller 250. The flight plan includes a range for generating a three-dimensional point group of the target object. The imaging conditions include an overlap rate and a sidelap rate for generating a three-dimensional point group by using SfM. The imaging device 200 acquires a large amount of image data in accordance with the imaging conditions.

Figure 7:
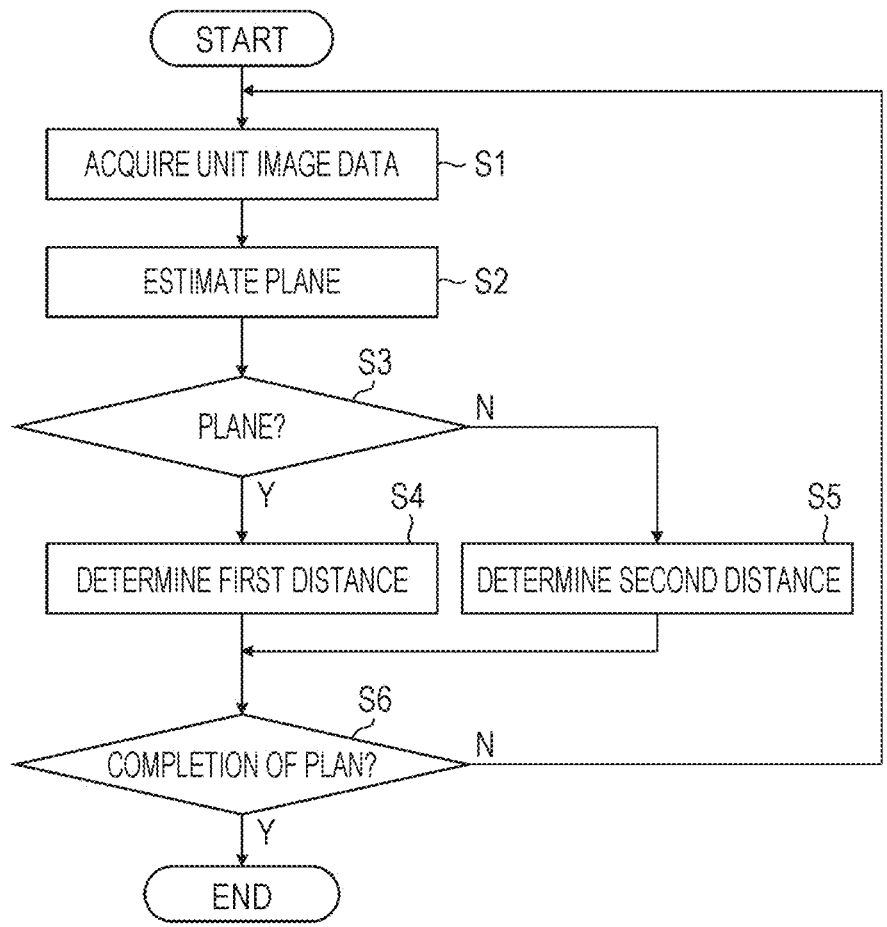
FIG. 7 is a flowchart describing an image capturing method.

Next, a method for performing imaging of a target object by using the imaging device 200 while causing the mobile object 100 to fly will be described. FIG. 7 is a flowchart describing an image capturing method performed by the imaging device 200 of the mobile object 100. The image capturing method includes a unit image data acquisition step (step S1), a plane estimation step (step S2), a plane determination step (step S3), a first distance determination step (step S4), a second distance determination step (step S5) for determining a second distance shorter than a first distance, and a plan completion determination step (step S6).

Figure 8:
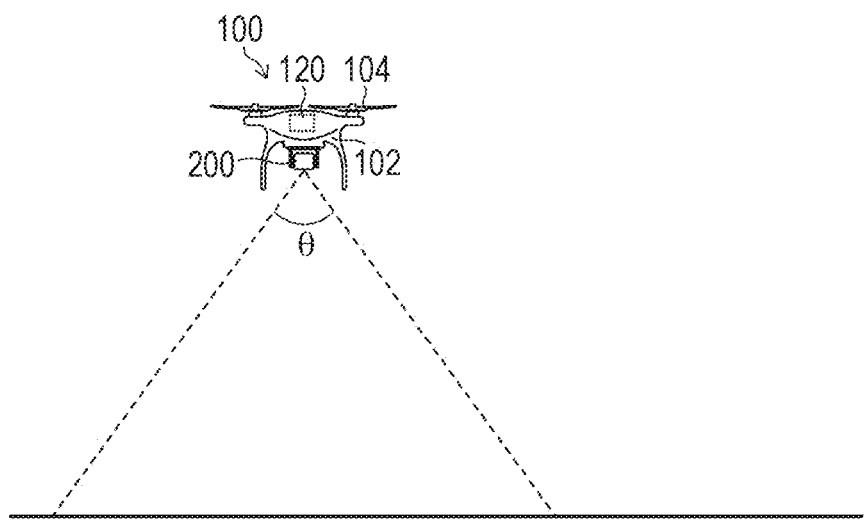
FIG. 8 is a diagram illustrating how the imaging device performs imaging of a target object while the mobile object is caused to fly.

In the unit image data acquisition step, unit image data in which the image data ID and the three-dimensional data TD are associated with each other is acquired for the target object during movement (step S1). As illustrated in FIG. 8, the mobile object 100 provided with the imaging device 200 flies around the target object in accordance with the flight plan. The image data acquisition device 202 (not illustrated) and the three-dimensional data acquisition device 204 (not illustrated), which are included in the imaging device 200, perform imaging of the target object within a range of an angle of view θ in accordance with imaging conditions during movement, and acquire the unit image data UID.

Figure 9:
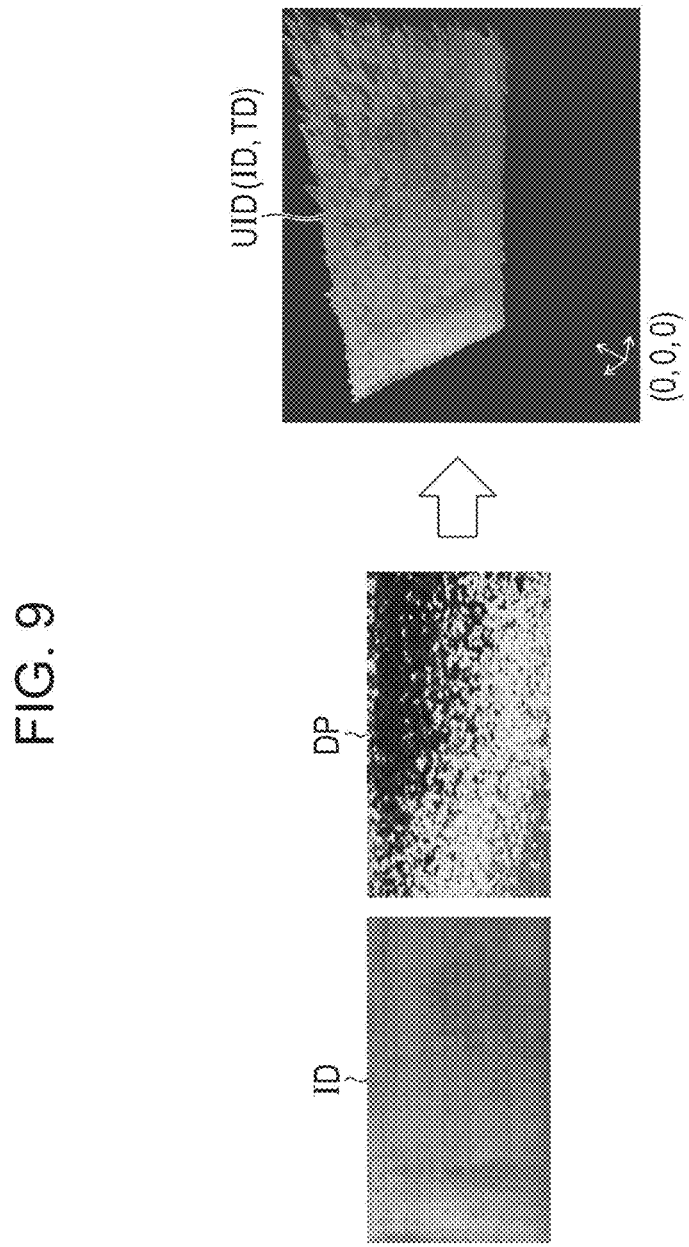
FIG. 9 is a diagram illustrating an example of image data and three-dimensional data that are acquired by the imaging device.

FIG. 9 is a diagram illustrating an example of the image data ID and the three-dimensional data TD, which are acquired by the imaging device 200. As illustrated in FIG. 9, the image data acquisition device 202 (not illustrated) acquires the image data ID, which is two-dimensional color image data. The three-dimensional data acquisition device 204 (not illustrated) acquires depth data DP up to the target object. The unit image data UID in which the image data ID and the three-dimensional data TD are associated with each other is acquired from the image data ID and the depth data DP. The depth data DP is indicated in blue in the case that the distance is short, and is indicated in red in the case that the distance is long. In an embodiment, an upper right portion is displayed in a color similar to blue, and a lower left portion is displayed in a color similar to red. The unit image data UID is input from the imaging device 200 to the control device 120.

In the plane estimation step, plane estimation is performed on an imaging target, based on the three-dimensional data TD of the unit image data UID (step S2). The plane estimation estimates a plane in an angle-of-view range by the image data acquisition device 202. For example, plane estimation is performed by the main control unit 122 in the control device 120. The plane estimation performed based on three-dimensional data of the angle-of-view range is performed by, for example, obtaining a plane equation represented by the following formula.

$$a_r x + b_r y + c_r z - d_r = 0 \tag{1}$$

In formula (1), x, y, and z are three-dimensional data in directions orthogonal to three axes of the camera coordinate system, and $a_r$, $b_r$, $c_r$, and $d_r$ represent coefficients of the plane equation. Coefficients $a_r$, $b_r$, $c_r$, and $d_r$ of a plane for which the squared distance to each point of the three-dimensional data (x, y, z) is minimum are obtained to determine a plane to be estimated.

Figure 10:
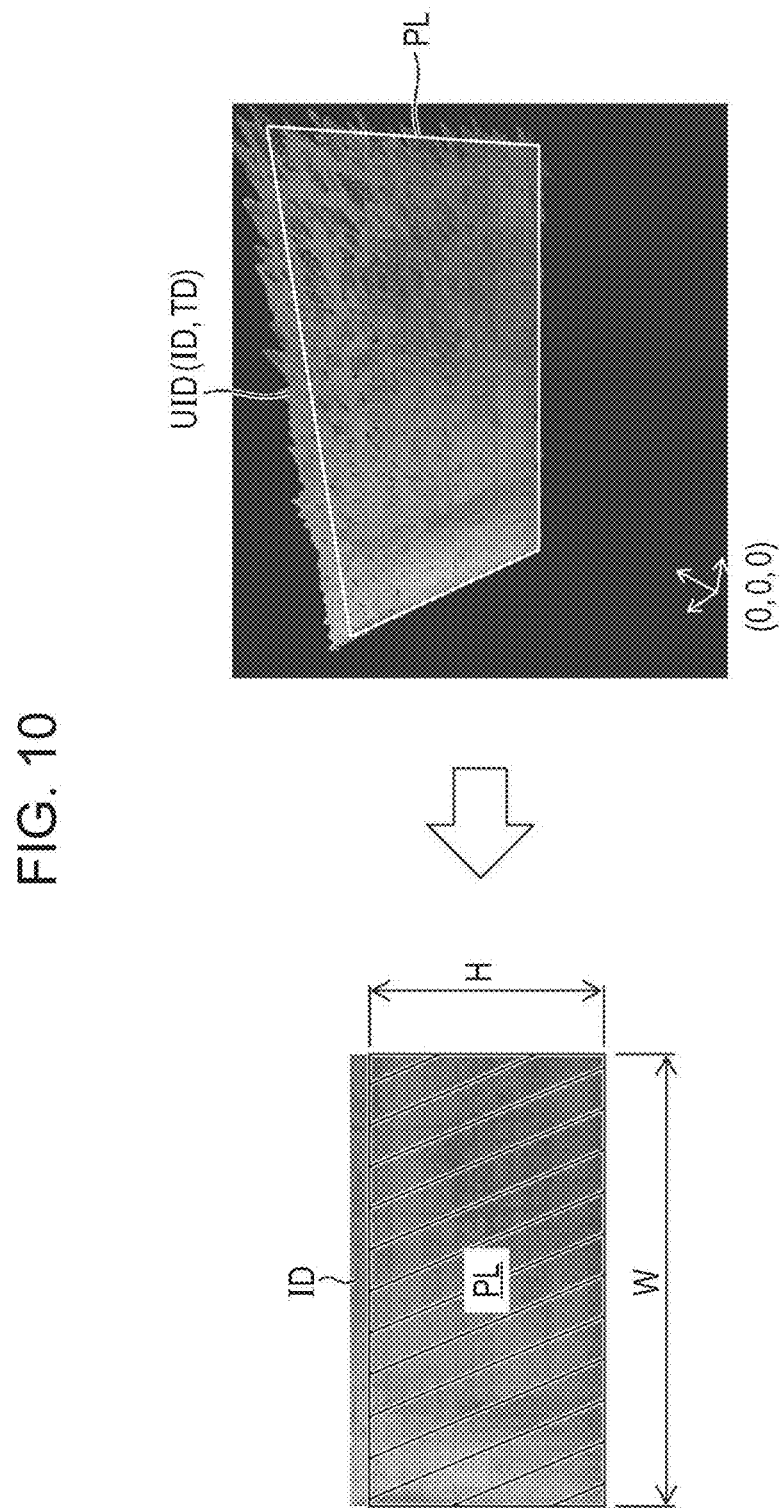
FIG. 10 is a diagram conceptually illustrating how a plane of the image data is estimated from the three-dimensional data.

FIG. 10 is a diagram conceptually illustrating how a plane in the image data ID is estimated from the three-dimensional data TD. As illustrated in FIG. 10, in the three-dimensional data TD of the unit image data UID, a range surrounded by a quadrilateral is estimated as a plane PL. The plane PL in the image data ID is estimated.

In the plane determination step, it is determined whether the imaging target is a plane (step S3). It is determined whether the most area within the imaging target, that is, within the angle-of-view range, is the plane PL. The determination of whether the imaging target is a plane is performed by, for example, the main control unit 122 in the control device 120. For example, a plane estimated in three-dimensional data is compared with the angle-of-view range. If it is determined in the plane determination step that the imaging target is a plane ("Y" is determined), the process proceeds to a step of determining a first distance.

Figure 11:
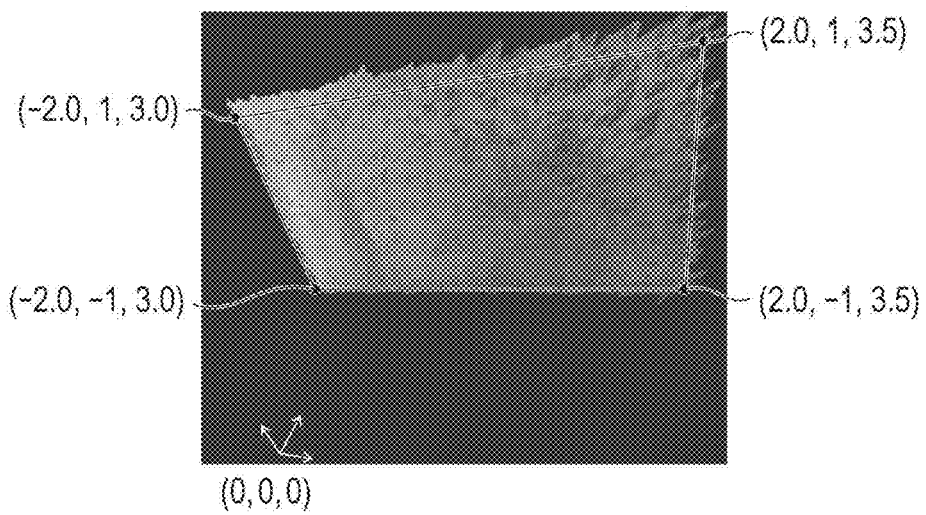
FIG. 11 is a diagram conceptually illustrating how three-dimensional data is added to unit image data.

In the step of determining the first distance, if it is determined that the imaging target is a plane, a first distance until the next unit image data is acquired is determined based on information on the plane (step S4). As illustrated in FIG. 11, for example, the coordinates of the three-dimensional data TD of the unit image data UID are added. The coordinates are illustrated at the four corners of the estimated plane PL. Here, (−2.0, 1, 3.0), (2.0, 1, 3.5), (2.0, −1, 3.5), and (−2.0, −1, 3.0) are illustrated. The size (the width W and the height H) of the plane PL is estimated from these four sets of coordinates (see FIG. 10).

A first distance L1 until the next unit image data is acquired can be obtained by formula (2) for movement in the lateral direction and by formula (3) for movement in the longitudinal direction. As presented in formula (2) and formula (3), the first distance L1 increases as the overlapping rate decreases. The overlapping rate can be set in advance. Different overlapping rates R1 can be set for movement in the lateral direction and movement in the longitudinal direction.

$$L1 = \text{Width W of estimated plane} \times (100\% - \text{overlapping rate R1}) \quad (2)$$

$$L1 = \text{Height H of estimated plane} \times (100\% - \text{overlapping rate R1}) \quad (3)$$

The step of determining the first distance is performed by, for example, the main control unit 122 in the control device 120. The first distance L1 is input from the main control unit 122 to the movement control unit 124 and the camera control unit 128, for example. The mobile object main body 102 and the imaging device 200 are prepared for the acquisition of the next unit image data.

If it is determined in the plane determination step (step S3) that the imaging target is not a plane ("N" is determined), the process proceeds to the second distance determination step (step S5) for determining a second distance shorter than the first distance. A second distance L2 can be obtained in advance as a default value by setting an overlapping rate R2 (an overlap rate and a sidelap rate) on the assumption that a three-dimensional point group based on SfM is created. In the second distance determination step, the second distance L2 is a default value. Different overlapping rates R2 can be set for movement in the lateral direction and movement in the longitudinal direction.

$$L2 = \text{Width W of imaging range} \times (100\% - \text{overlapping rate R2}) \quad (4)$$

$$L2 = \text{Height H of imaging range} \times (100\% - \text{overlapping rate R2}) \quad (5)$$

The overlapping rate R1 for obtaining the first distance L1 is set smaller than the overlapping rate R2 for obtaining the second distance L2. As a result, the first distance L1 is longer than the second distance L2. After the first distance determination step (step S4) or the second distance determination step (step S5), the process proceeds to the plan completion determination step.

In the plan completion determination step, it is determined whether the plan (flight plan and imaging conditions) set in advance for the target object is completed (step S6).

If it is determined in the plan completion determination step that plan is not completed ("N" is determined), the process proceeds to the unit image data acquisition step (step S1).

Figure 12:
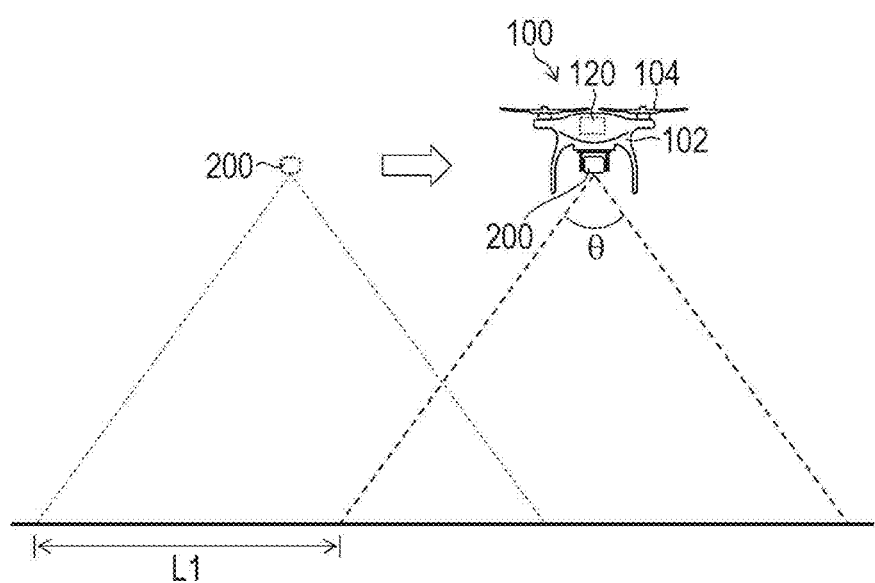
FIG. 12 is a diagram conceptually illustrating how the mobile object acquires unit image data by moving by a first distance.

When the first distance determination step (step S4) is executed, in the unit image data acquisition step (step S1), as illustrated in FIG. 12, the mobile object 100 moves in parallel by the first distance L1 from the estimated plane while maintaining the distance to the estimated plane. The imaging device 200 provided in the mobile object 100 acquires the next unit image data for the target object.

Figure 13:
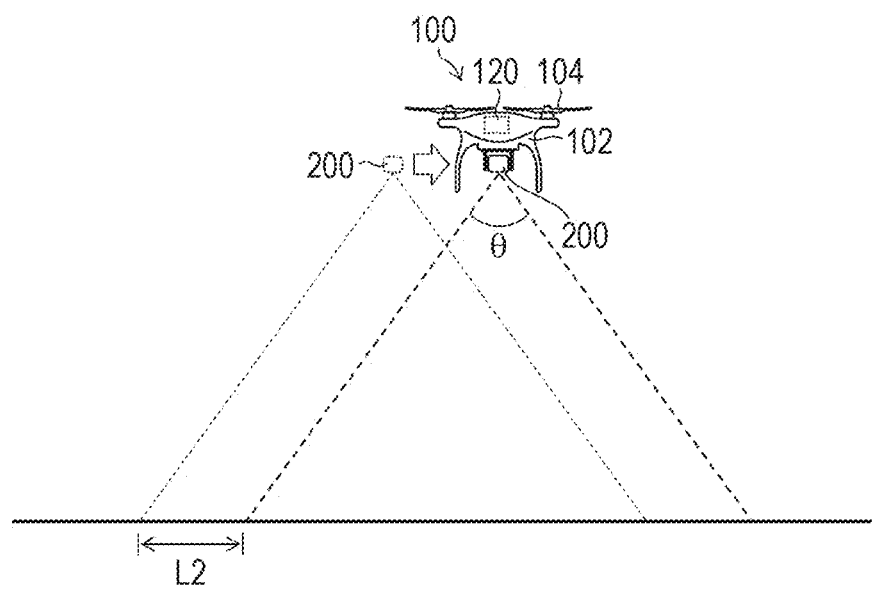
FIG. 13 is a diagram conceptually illustrating how the mobile object acquires unit image data by moving by a second distance.

When the second distance determination step (step S5) is executed, in the unit image data acquisition step (step S1), as illustrated in FIG. 13, the mobile object 100 moves in parallel by the second distance L2 from the estimated plane while maintaining the distance to the estimated plane. The imaging device 200 provided in the mobile object 100 acquires the next unit image data for the target object.

When FIG. 12 and FIG. 13 are compared, the first distance L1 is longer than the second distance L2. That is, upon estimation of a plane, a distance until the next unit image data is acquired is long, and the number of pieces of image data ID to be acquired for the target object can thus be reduced.

The unit image data acquisition step (step S1), the plane estimation step (step S2), the plane determination step (step S3), the first distance determination step (step S4) or the second distance determination step (step S5), and the plan completion determination step (step S6) are repeatedly executed until it is determined in the plan completion determination step (step S6) that the plan is completed ("Y" is determined). If it is determined in the plan completion determination step (step S6) that the plan is completed ("Y" is determined), the mobile object 100 stops imaging using the imaging device 200 and returns to, for example, a predetermined position.

Creation of Three-Dimensional Point Group

Figure 14:
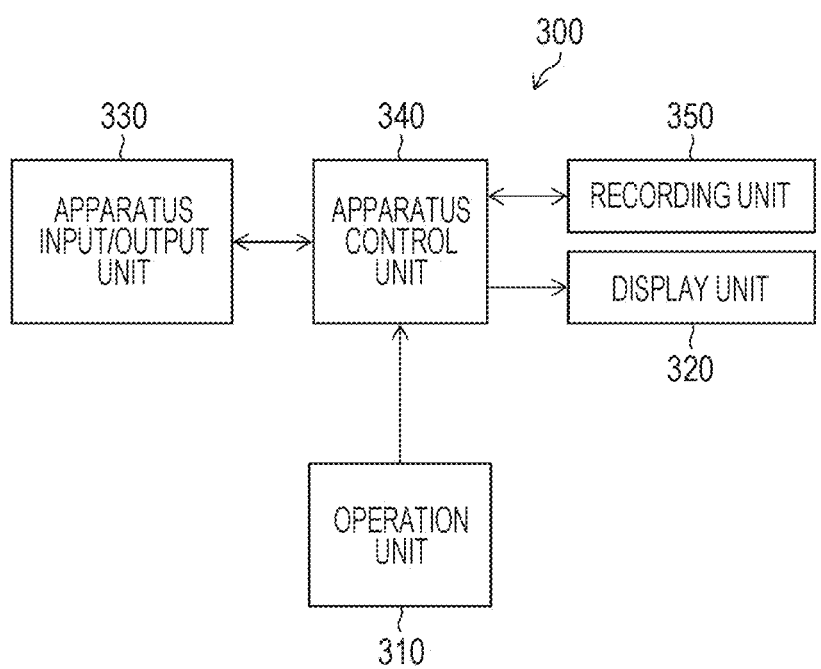
FIG. 14 is a block diagram of an image processing apparatus.

Next, a first procedure for creating a three-dimensional point group using the reduced image data ID will be described. The unit image data UID (the image data ID and the three-dimensional data TD) of the target object, which is acquired by the imaging device 200 of the mobile object 100, is input to the image processing apparatus 300. As illustrated in FIG. 14, the image processing apparatus 300 is constituted by, for example, the operation unit 310, the display unit 320, an apparatus input/output unit 330, an apparatus control unit 340, and a recording unit 350.

Information is input to and output from the apparatus input/output unit 330 through wireless or wired connection. For example, the plurality of pieces of unit image data UID acquired by the mobile object 100 are input through the apparatus input/output unit 330.

The apparatus control unit 340 acquires the unit image data UID through the apparatus input/output unit 330 and creates a three-dimensional point group. Further, the apparatus control unit 340 controls recording in the recording unit 350, controls display on the display unit 320, and performs control in response to a command input from the operation unit 310.

The display unit 320 performs display under the control of the apparatus control unit 340. For example, the display unit 320 displays a three-dimensional point group to which damage is mapped.

The recording unit 350 records various types of information under the control of the apparatus control unit 340. For example, the recording unit 350 records the created three-dimensional point group. The recording unit 350 records various programs for controlling the apparatus control unit 340.

Figure 15:
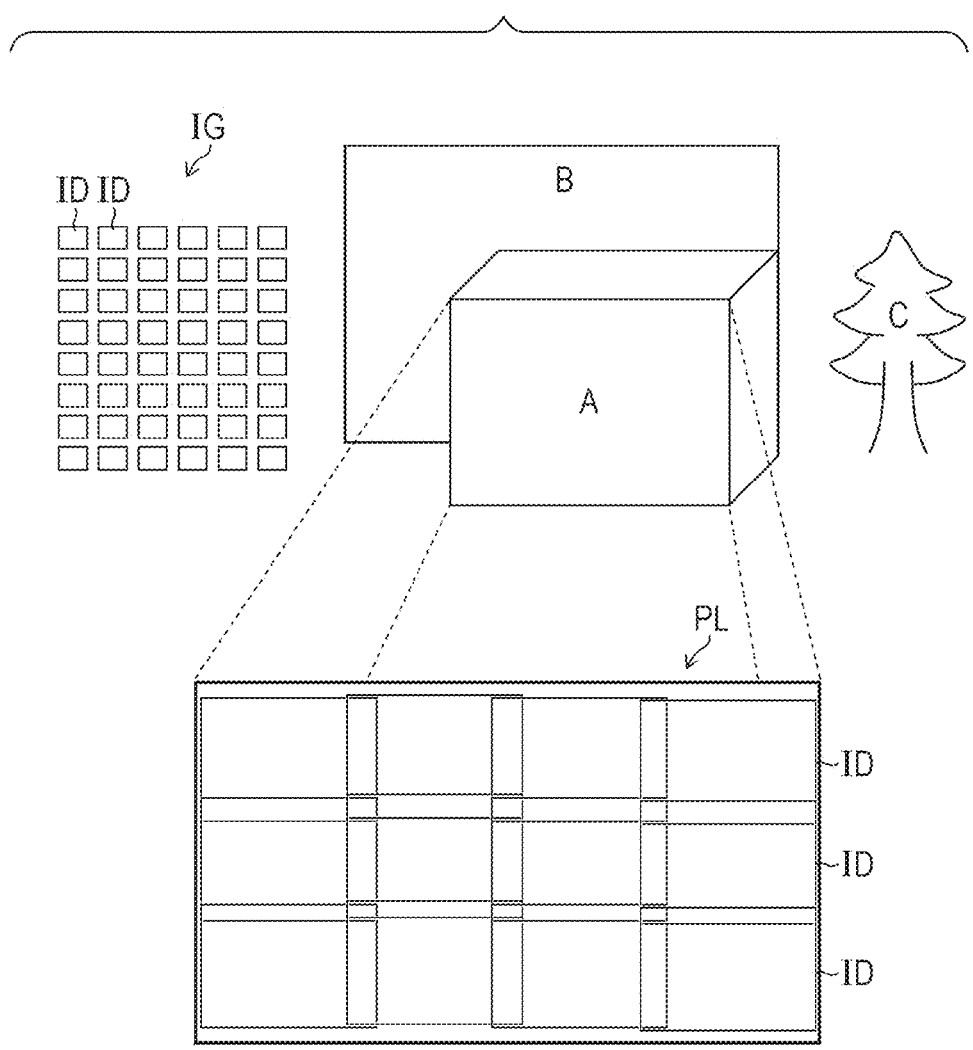
FIG. 15 is a diagram describing creation of a three-dimensional point group.

In the following embodiment, as illustrated in FIG. 15, it is assumed that the plane PL is estimated for a portion of the structure A. Imaging is performed on the plane PL to acquire image data ID. A plurality of pieces of image data ID are acquired by the imaging device 200 by causing the mobile object 100 to move by the first distance L1, as illustrated in FIG. 12. A plurality of pieces of image data ID of a portion of the structure A other than the plane are acquired by the imaging device 200 by causing the mobile object 100 to move by the second distance L2, as illustrated in FIG. 13. For a portion of the structure A other than the plane, an image group IG including a plurality of pieces of image data ID necessary for SfM is acquired.

Figure 16:
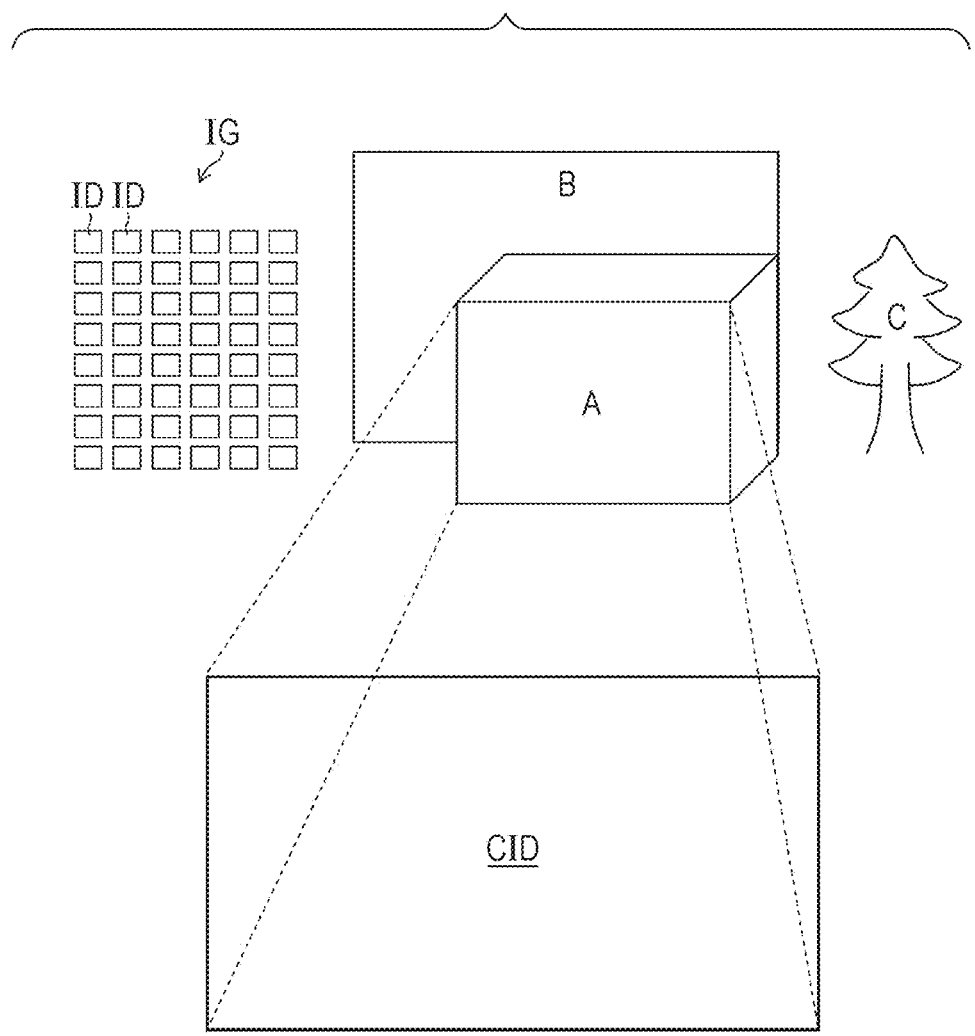
FIG. 16 is a diagram describing creation of a three-dimensional point group.

Then, as illustrated in FIG. 16, the pieces of image data ID obtained by performing imaging of the plane PL are combined. As a result, composite image data CID corresponding to the plane of the structure A can be created. The composite image data CID can be created using pattern matching, namely, block matching. In the block matching, a block having a predetermined size is set for one of the pieces of image data ID, and the block is scanned across the other pieces of image data ID to calculate correlation values. Then, a portion having a highest correlation value is determined as a location that overlaps the block, and adjacent pieces of image data ID are coupled and combined. Since the plane PL is estimated, the pieces of image data ID can accurately be coupled and combined to obtain the composite image data CID.

Figure 17:
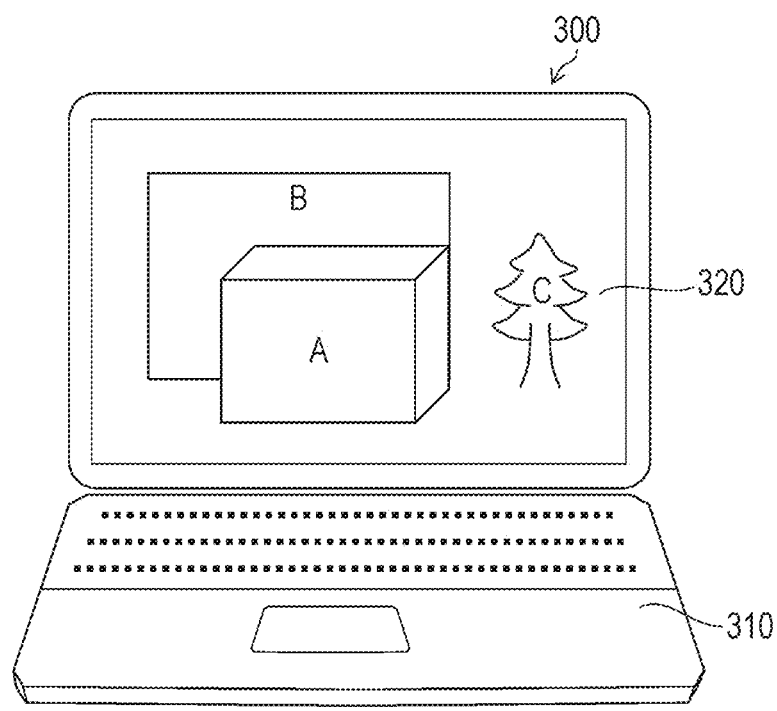
FIG. 17 is a diagram illustrating the image processing apparatus on which a three-dimensional point group is displayed.

Finally, the imaging position and the posture of the imaging device 200 and the coordinates of the target object are estimated from the image group IG by using SfM. Further, MVS (Multi-view Stereo) processing is performed to increase the density, and a three-dimensional point group is created. The image group IG does not include a portion corresponding to the estimated plane PL. Accordingly, the composite image data CID is arranged using point group information that is obtained by SfM and that is adjacent to the plane PL. As a result, as illustrated in FIG. 17, three-dimensional point groups corresponding to the target object can be created. In an embodiment, the image group IG and the composite image data CID are subjected to SfM processing to create a three-dimensional point group.

In SfM, feature points included in areas where the pieces of image data ID of the image group IG overlap are extracted, and a correspondence relationship of the feature points between the pieces of image data ID is identified.

Known local feature values robust to scaling (different imaging distances), rotation, and the like between the pieces of image data ID include a SIFT (Scale-invariant feature transform) feature value, a SURF (Speed-Upped Robust Feature) feature value, and an AKAZE (Accelerated KAZE) feature value. The number of correspondence points (the number of sets) having matching feature values is preferably several tens or more, and therefore the overlap rate and/or the sidelap rate between the pieces of image data ID in the image group IG is preferably large.

Next, a second procedure for creating a three-dimensional point group using the reduced image data ID will be described.

Figure 18:
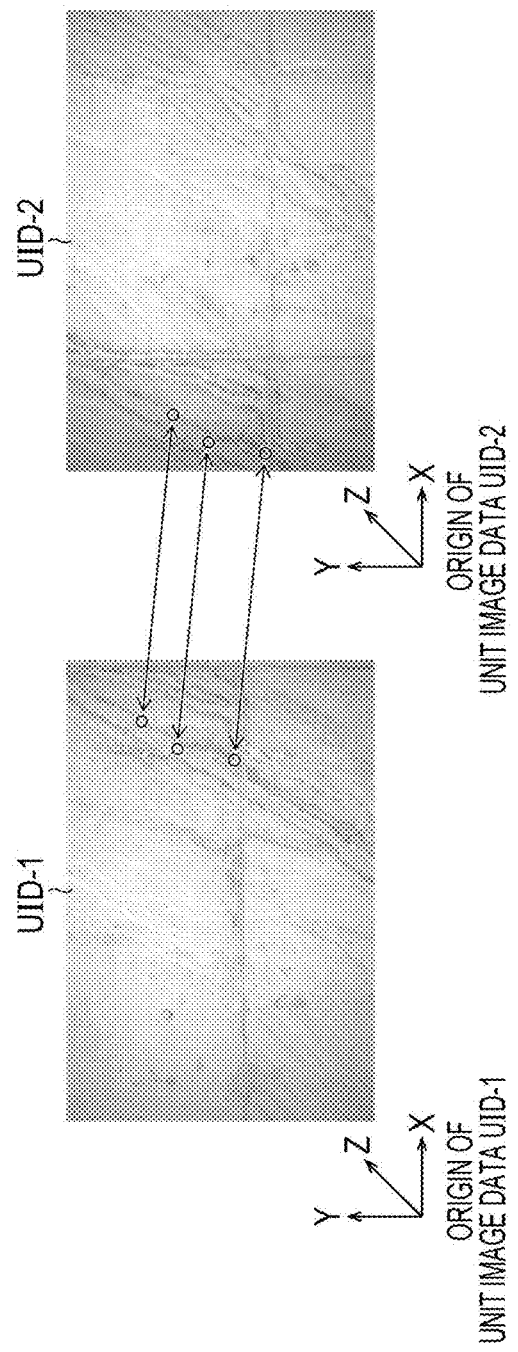
FIG. 18 is a diagram describing creation of another three-dimensional point group.

FIG. 18 illustrates two pieces of unit image data, namely, unit image data UID-1 and unit image data UID-2, which are input to the image processing apparatus 300, in respective camera coordinate systems. The camera coordinate systems are coordinate systems of the imaging device 200, with the origin at the center of the lens.

The unit image data UID-1 and the unit image data UID-2 are obtained at different imaging positions, and the origins of the respective camera coordinate systems are different. In the unit image data UID-1 and the unit image data UID-2, each point at the coordinates (x, y, z) has values (R, G, B). The apparatus control unit 340 extracts feature points, as indicated by arrows, from each of the unit image data UID-1 and the unit image data UID-2. The relationship between the feature points of the unit image data UID-1 and the feature points of the unit image data UID-2 is obtained.

Figure 19:
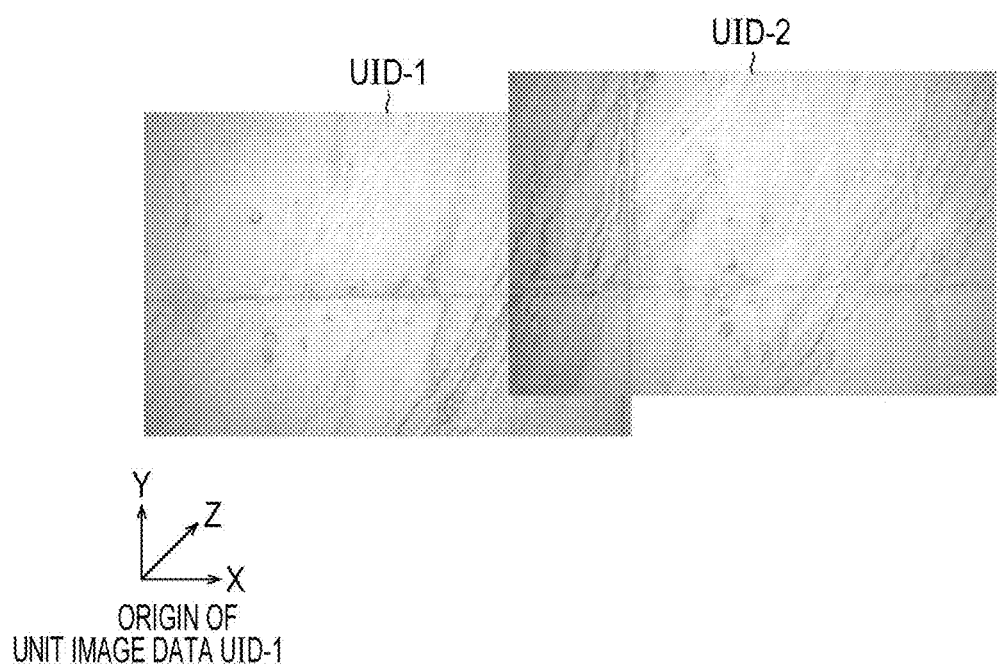
FIG. 19 is a diagram describing creation of another three-dimensional point group.

In the case where the relationship between the feature points of the unit image data UID-1 and the feature points of the unit image data UID-2 is recognized, as illustrated in FIG. 19, the unit image data UID-2 can be projected onto the space of the camera coordinate system of the unit image data UID-1.

The processing described above is performed on the estimated unit image data UID for the plane PL. As a result, a point group can be collected as a model in the space of one camera coordinate system.

Finally, point group information that is obtained by SfM and that is adjacent to the plane PL, and the point group collected in the processing described above can be used to create the three-dimensional point groups corresponding to the target object illustrated in FIG. 17 in a manner similar to that in the first procedure.

Since the unit image data UID is reduced in the image group data, the load of processing using the image data ID is small. Since the plane PL is estimated in the image group data, the relationship of feature points between the pieces of unit image data UID can be easily obtained.

The first procedure and the second procedure are implemented by the imaging device 200 of the mobile object 100 acquiring a plurality of pieces of image data ID of a target object, extracting a plurality of feature points from the plurality of pieces of image data ID, performing matching of the plurality of feature points, and calculating the position and posture of the imaging device 200 and a three-dimensional point group of the feature points. In an embodiment, a plane of a target object is estimated to reduce the image data to be acquired. Accordingly, the processing time can be reduced.

Hardware for implementing an image processing apparatus according to the present invention can be constituted by various processors. The various processors include a CPU (Central Processing Unit), which is a general-purpose processor that executes a program to function as various processing units, a programmable logic device (PLD), which is a processor whose circuit configuration can be changed after manufacture, such as an FPGA (Field Programmable Gate Array), a dedicated electric circuit, which is a processor having a circuit configuration designed specifically to execute specific processing, such as an ASIC (Application Specific Integrated Circuit), and so on. A single processing unit constituting an image display device may be configured by one of the various processors described above or may be configured by two or more processors of the same type or different types. For example, the single processing unit may be configured by a plurality of FPGAs or a combination of a CPU and an FPGA. Alternatively, a plurality of processing units may be configured by a single processor. Examples of configuring a plurality of processing units by a single processor include, first, a form in which, as typified by a computer such as a client and a server, the single processor is configured by a combination of one or more CPUs and software and the processor functions as a plurality of processing units. The examples include, second, a form in which, as typified by a system on chip (SoC) or the like, a processor is used in which the functions of the entire system including the plurality of processing units are implemented by a single IC (Integrated Circuit) chip. As described above, the various processing units are configured using one or more of the various processors described above as a hardware structure. The hardware structure of these various processors can be implemented by, more specifically, an electric circuit (circuitry) made by a combination of circuit elements such as semiconductor elements.

While the present invention has been described, the present invention is not limited to the above examples and may be improved or modified in various ways without departing from the scope of the present invention.

REFERENCE SIGNS LIST 100 mobile object
102 mobile object main body
104 propulsion unit
120 control device
122 main control unit
124 movement control unit
126 airframe-side wireless communication control unit
128 camera control unit
150 propeller drive motors
152 motor driver
154 sensor unit
156 airframe-side wireless communication unit
200 imaging device
202 image data acquisition device
204 three-dimensional data acquisition device
250 controller
250A controller operation unit
250B controller display unit
250C controller-side wireless communication unit
250D controller microcomputer
300 image processing apparatus
310 operation unit
320 display unit
330 apparatus input/output unit
340 apparatus control unit
350 recording unit

What is claimed is:

1. A mobile object that acquires two-dimensional image data and three-dimensional data of a target object for generating a three-dimensional model of the target object, the mobile object comprising:
 a mobile object main body;
 an image data acquisition device that is comprised in the mobile object main body and includes a camera including an imaging element to acquire two-dimensional image data of the target object, the image data acquisition device being calibrated;
 a three-dimensional data acquisition device that includes any one of a stereo camera, a laser scanner and a time-of-flight camera, and acquires three-dimensional data of the target object; and
 a processor configured to:
  acquire, for the target object, unit image data in which image data acquired for each angle of view of the image data acquisition device and three-dimensional data acquired by the three-dimensional data acquisition device are associated with each other from the image data acquisition device;
  perform plane estimation on the target object, based on the three-dimensional data;
  determine whether the target object is planar by correlating the three-dimensional data with a plane;
  determine a distance until next unit image data is acquired as a first distance and determine an overlapping rate of the next unit image data obtained based on the first distance as a first overlap rate, in a case where it is determined that the target object is planar; and
  determine the distance until next unit image data is acquired as a second distance and determine the overlapping rate of the next unit image data obtained based on the second distance as a second overlap rate, in a case where it is determined that the target object is non-planar,
 wherein the first distance is set longer than the second distance and the first overlapping rate is set smaller than the second overlapping rate, thereby reducing an amount of the two-dimensional image data acquired by the image data acquisition device in a case where it is determined that the target object is planar, and reducing processing load in generating the three-dimensional model using the two-dimensional image data.

2. The mobile object according to claim 1, wherein the image data acquisition device simultaneously acquires the image data and the three-dimensional data.

3. The mobile object according to claim 2, wherein the image data is two-dimensional color image data.

4. The mobile object according to claim 1, wherein the image data is two-dimensional color image data.

5. The mobile object according to claim 1, wherein the mobile object main body comprising the image data acquisition device and the processor is an unmanned aerial vehicle.

6. The mobile object according to claim 1, wherein, in the plane estimation, the processor obtains a plane for which a squared distance to each point of the three-dimensional data in the unit image data is minimum.

7. A processor that is comprised in a mobile object main body and that controls an image data acquisition device and a three-dimensional data acquisition device to acquire two-dimensional image data and three-dimensional data of a target object for generating a three-dimensional model of the target object, the image data acquisition device being comprised in the mobile object main body and including a camera that includes an imaging element to acquire two-dimensional image data of the target object, the image data acquisition device being calibrated, the three-dimensional data acquisition device including any one of a stereo camera, a laser scanner and a time-of-flight camera, and acquires three-dimensional data of the target object, wherein the processor implements a method to:
 acquire, for the target object, unit image data in which image data acquired for each angle of view of the image data acquisition device and three-dimensional data acquired by the three-dimensional data acquisition device are associated with each other from the image data acquisition device;

perform plane estimation on the target object, based on the three-dimensional data;

determine whether the target object is planar by correlating the three-dimensional data with a plane;

determine a distance until next unit image data is acquired as a first distance and determine an overlapping rate of the next unit image data obtained based on the first distance as a first overlap rate, in a case where it is determined that the target object is planar; and determine the distance until next unit image data is acquired as a second distance and determine the overlapping rate of the next unit image data obtained based on the second distance as a second overlap rate, in a case where it is determined that the target object is non-planar, wherein the first distance is set longer than the second distance and the first overlapping rate is set smaller than the second overlapping rate, thereby reducing an amount of the two-dimensional image data acquired by the image data acquisition device in a case where it is determined that the target object is planar, and reducing processing load in generating the three-dimensional model using the two-dimensional image data.

8. An imaging method that acquires two-dimensional image data and three-dimensional data of a target object for generating a three-dimensional model of the target object, the imaging method comprising:

acquiring, for a target object, unit image data in which image data from an image data acquisition device and three-dimensional data from a three-dimensional data acquisition device are associated with each other, during movement, wherein the image data acquisition device includes a camera including an imaging element to acquire two-dimensional image data of the target object, the image data acquisition device is calibrated, and the three-dimensional data acquisition device includes any one of a stereo camera, a laser scanner and a time-of-flight camera, and acquires three-dimensional data of the target object;

performing plane estimation on the target object, based on the three-dimensional data of the unit image data;

determining whether the target object is planar by correlating the three-dimensional data with a plane;

determine a distance until next unit image data is acquired as a first distance and determine an overlapping rate of the next unit image data obtained based on the first distance as a first overlap rate, in a case where it is determined that the target object is planar; and determine the distance until next unit image data is acquired as a second distance and determine the overlapping rate of the next unit image data obtained based on the second distance as a second overlap rate, in a case where it is determined that the target object is non-planar, wherein the first distance is set longer than the second distance and the first overlapping rate is set smaller than the second overlapping rate, thereby reducing an amount of the two-dimensional image data acquired by the image data acquisition device in a case where it is determined that the target object is planar, and reducing processing load in generating the three-dimensional model using the two-dimensional image data.

9. The imaging method according to claim 8, wherein, in the plane estimation, a plane for which a squared distance to each point of the three-dimensional data in the unit image data is minimum, is obtained.

* * * * *